(12) United States Patent
Riva et al.

(10) Patent No.: US 7,063,761 B2
(45) Date of Patent: *Jun. 20, 2006

(54) METHOD OF MOUNTING A TIRE ON A RIM

(75) Inventors: Guido Riva, Milan (IT); Gurdev Orjela, Arlon (BE); Syed Khawja Mowdood, Hudson, OH (US); Alessandro Volpi, Milan (IT); Claudio Villani, Milan (IT)

(73) Assignee: Pirelli Pneumatici S.p.A., Milan (IT)

( * ) Notice: Subject to any disclaimer, the term of this patent is extended or adjusted under 35 U.S.C. 154(b) by 303 days.

This patent is subject to a terminal disclaimer.

(21) Appl. No.: 10/377,711

(22) Filed: Mar. 4, 2003

(65) Prior Publication Data

US 2003/0159767 A1 Aug. 28, 2003

Related U.S. Application Data

(62) Division of application No. 09/427,708, filed on Oct. 27, 1999, now Pat. No. 6,554,039.

(60) Provisional application No. 60/106,628, filed on Nov. 2, 1998.

(30) Foreign Application Priority Data

Oct. 28, 1998 (EP) .................................. 98120358

(51) Int. Cl.
*B29D 30/48* (2006.01)
*B60C 15/04* (2006.01)

(52) U.S. Cl. ................... 156/131; 156/110.1; 152/540; 245/1.5; 148/402

(58) Field of Classification Search ............ 156/110.1, 156/131, 136; 152/540; 245/1.5; 148/402; 428/375, 377, 378, 379
See application file for complete search history.

(56) References Cited

U.S. PATENT DOCUMENTS

| 4,894,100 A | 1/1990 | Yamauchi et al. |
| 5,242,002 A | 9/1993 | Oku |
| 6,672,353 B1 * | 1/2004 | Riva et al. .................. 152/540 |

FOREIGN PATENT DOCUMENTS

| DE | 3829460 | 3/1990 |
| EP | 0290328 | 11/1988 |

OTHER PUBLICATIONS

C.M. Wayman et al.; "An Introduction to Martensite and Shape Memory," in Engineering Aspects of Shape Memory Alloys, pp. 3-21, published by Butterworth-Heinemann, London (T.W. Duerig ed., 1990).

(Continued)

*Primary Examiner*—Jeff H. Aftergut
*Assistant Examiner*—Justin Fischer
(74) *Attorney, Agent, or Firm*—Finnegan, Henderson, Farabow, Garrett & Dunner, L.L.P.

(57) ABSTRACT

A method of mounting a tire on a rim includes selecting a tire comprising bead cores, stretching the bead cores, sliding the bead cores over a balcony portion of the rim, allowing the bead cores to elastically return to lengths corresponding to diameters of respective seats of the rim, and inflating the tire. The bead cores include one or more portions of material with characteristics of superelasticity and shape memory. Stretching the bead cores may include applying constant load to the bead cores at ambient temperature and/or causing the bead cores to undergo structural change at ambient temperature. The structural change may include complete or partial change from austenitic structure to martensitic structure. The one or more portions of material are deformable at ambient temperature in response to a constant force and recover to original shape upon removal of the constant force.

41 Claims, 4 Drawing Sheets

OTHER PUBLICATIONS

Y. Suzuki et al., "Fatigue Properties of Ni-Ti Shape Memory Alloys," in Engineering Aspects of Shape Memory Alloys, pp. 256-259, published by Butterworth-Heinemann, London (T.W. Duerig ed., 1990).

G.R. Zadno et al., "Linear Superelasticity in Cold-Worked Ni-Ti," in Engineering Aspects of Shape Memory Alloys, pp. 414-419, published by Butterworth-Heinemann, London (T.W. Duerig ed., 1990).

I. Masanori, "Tire," Patent Abstracts of Japan, vol. 017, No. 237, of JP 04-362,401 (Dec. 15, 1992).

* cited by examiner

METHOD OF MOUNTING A TIRE ON A RIM

This application is a divisional of U.S. patent application Ser. No. 09/427,708, filed Oct. 27, 1999, in the U.S. Patent and Trademark Office ("USPTO"), now U.S. Pat. No. 6,554,039 the contents of which are incorporated herein by reference; additionally, Applicants claim the right of priority under 35 U.S.C. § 119(a)–(d) based on patent application Ser. No. 98120358.1, filed Oct. 28, 1998, in the European Patent Office; further, Applicants claim the benefit under 35 U.S.C. § 119(e) based on provisional application No. 60/106,628, filed Nov. 2, 1998, in the USPTO.

BACKGROUND OF THE INVENTION

1. Field of the Invention

The present invention relates to a bead wire for a bead core of a tire and to a tire incorporating the same, and more particularly to a bead wire for a bead core of a tire designed to allow easy mounting of the tire on a wheel rim and also designed to resist the separation of the tire from the rim under diverse operating conditions.

2. Description of Related Art

As is known in the art, a tire generally comprises at least one carcass reinforcing ply having edges turned up around bead cores, a tread, and belts placed between the carcass and the tread. Strips of rubber filling are positioned between the sides of the carcass reinforcing ply and the upturned edges of the same reinforcing ply. The portion of the tire comprising the bead core and the rubber filling forms the tire beads, which function to anchor the tire over a corresponding mounting rim.

The wheel rim comprises a central cylindrical channel from which branch off axially and outwardly, from opposite sides, diverging surfaces each terminating in a vertical peripheral flange called the "rim balcony". The diverging surfaces form the bead seats for the beads of the tire.

The bead core is substantially inextensible in circumferential direction and can be formed of a single element or of several elements, such as steel wires, steel cords, and other similar components placed in an annular disposition. The individual elements are referred to as bead wires, and when assembled together they form the bead core.

The inner diameter of the tire beads substantially coincides with the diameter of the innermost surface of the bead cores, except for a difference between the two diameters caused by a thin lining of rubber. The diameters of the inner annular surfaces of the bead cores and tire beads are smaller than the diameter of the rim balcony, and are chosen so that, once the beads are forced over the balcony to their respective bead seats on the rim, they are pushed along the diverging surfaces of the bead against the inner surfaces of the flanges by the pressure of the air inside the tire.

The operations of mounting the tire onto the rim are performed according to methods well known to those skilled in the art. The operation starts by deforming the first bead of a tire into an oval configuration, so that when positioned in front of the rim with the oval aperture suitably oriented, a portion of the bead slips over the balcony of the rim. Then the rest of the bead completely slips over the rim balcony, so that the bead can then be pushed toward the bead seat. The preceding steps are then repeated for the second bead. Finally, the tire is inflated to press the beads against the internal surfaces of the rim balcony of the bead seat.

Because of the rigidity of the bead cores, mounting the tire on the rim requires application of a large force to deform the bead core from its circular configuration to an oval one, causing obvious difficulties of application for certain bead core structures, and with a risk of breakage in some circumstances if the limits of elastic deformability of the bead wires are exceeded.

Since the pressurized air in the tire is used to maintain the tire bead pressed against the inner surface of the rim flange, when the tire deflates this force is no longer applied, and the tire bead can leave its bead seat falling into the central channel of the rim. This unseating, usually, immobilizes the vehicle because the rim balcony quickly enters in contact with the pavement, making traction and control of the vehicle impossible. For example, a conventional tire is inflated at an operating pressure of 1.8–2.0 bars. When the inflation pressure falls below approximately 0.8 bars, the tire beads are likely to unseat from the bead seats. As a result, a second requirement for modern tires is to be able to remain in place on the rim even in the event of a perforation and subsequent loss of air within the tire. This requirement calls for a bead core exerting sufficient force on the rim so that the tire beads will remain seated on the rim, even in the absence of air pressure pushing them in place. This result cannot be achieved using conventional bead cores, unless humps are formed on the rim to act as a barrier preventing the beads from slipping in the center channel portion of the rim. According to the state of the art, it has not been possible to provide bead cores that exert sufficient force on the rims to maintain the tire beads on the rim when the tire deflates, and that at the same time can be stretched sufficiently to allow mounting of each tire on the rim with conventional tools.

Several types of conventional bead cores used in tire beads are known. For example, a first design provides for a bead core formed by a rubber-coated steel wire wound in a spiral to form a first layer of side-by-side coils. Subsequent layers are superposed on the first layer, and also consist of helical windings of the same wire. One known construction of this type of bead core comprises four layers of four wires each. An additional type of bead core calls for the use of several individual wires and, more precisely, of a first wire wound in a spiral to form several coils arranged radially in a vertical plane. Subsequent wires are similarly wound in vertical planes, and are placed side by side to the first plane. One such construction known as 4×4 comprises four wires disposed in four layers.

Bead cores with improved characteristics of flexibility, and consequently greater deformability without risk of breakage, are also known. One of these known structures is a spiral bead core. This bead core is formed of a central cable around which several wires are wound in a spiral. In this design, 4 or 5 groups of steel wires can be disposed in a structure having 4 or 5 layers of the steel wire groups, set up in a spiral pattern. However, the construction of this spiral bead core requires a number of separate reels for the cable and for the various wires. This results in increased manufacturing costs than, for example, those incurred in the construction of a bead core containing a single type of wire.

Another problem encountered in mounting tires is that generally, in the construction of the bead cores as well as in the construction of the wheel rims, the actual dimensions obtained often vary from their selected tolerances. In these cases, dovetailing of the tire bead over the relative bead seats can occur. This may result in breaking of the bead core when the actual diameter of the tire bead is significantly smaller than the specified dimension, or in slipping of the tire bead over the bead seat during rotation when the bead core is larger than the specified dimension.

German Patent Application DE 3829460 A1 describes a bead core made with a shape-memory material, preferably a Ni—Ti alloy. The mounting method described in the application calls for temporarily deforming the bead core into an oval configuration, and after mounting the tire on the rim, submitting the bead core to heat treatment at the crystallization temperature of the alloy (between 65 Deg. C. and 90 Deg. C. ), so that the bead core recovers its annular shape. Thus this method provides a bead core that holds the tire beads against the rim with sufficient force while being elastic enough to allow mounting of the tire. However, the mounting of the tire according to this method requires specialized tools and heating equipment.

Known practices to resist tire unseating are generally based on modifying the surfaces of contact of both the tire beads and the bead seats. One of these practices entails using a protuberance on the base of the tire bead and an aperture on the rim designed to receive the protuberance. The protuberance of the tire bead when inserted into the aperture of the rim prevents the tire beads from separating from the rim.

SUMMARY OF THE INVENTION

The search for a suitable design for bead cores must take into consideration the ability of the bead to be deformed when the tire is mounted on a wheel rim, while also keeping the beads of the tire elastically clamped to the rim after mounting. This gives rise to a first requirement that must be satisfied by materials used in forming the bead cores, which is that the material should have the ability to be stretched to a great extent without failing. In addition, the material must be able to return to its original shape once the load has been removed, at ambient temperature and without retaining the effects from the previous stretching.

These requirements are made even more complex and urgent by the additional need to make tires that can travel tens of kilometers after going flat, without the tire separating from the rim. Ideally, a flat tire should be able to provide a safe ride for the driver and passengers of a vehicle to reach a garage where it can be changed, possibly after traveling distances of at least 50 to 100 km, at speeds approximately up to 80 km/hr.

The desired safety features require that the tire beads of a flat tire remain in the respective bead seats, even with no air pressure pushing on the inner surfaces of the tire beads. The tire beads must be prevented from slipping inwards toward the smaller rim diameter of the central cylindrical channel, causing unseating of the tire beads when transverse forces generated by a turn are present.

In view of the aforementioned state of the art, the Applicant realized that to obtain an acceptable solution without technical and/or economic drawbacks, it was necessary to keep the parts of the tire and rim involved in the mounting phase at ambient temperature. It was also necessary to use standard parts at the interface of the rim and the tire, including the parts responsible for keeping the deflated tire attached to the rim. This precluded using mechanical couplings to resist unseating of the tire.

Applicant also realized that an optimal solution could result from the harnessing of the very conditions that arise specifically in a deflated tire, seeking where possible to use the resulting phenomena to counter the risk of unseating. It has been observed that under deflation conditions, the sides of the tire fold and bring the two resulting parts of the folded sidewall into contact with each other, causing rubbing, which causes heating of the entire folded area all the way to the bead cores.

In determining an optimal solution, the Applicant realized that the effect of a temperature increase, being transmitted to the bead core, could cause a reaction inside the bead core if it were made of a material chosen so as to respond to a temperature increase. It was also understood that an optimal solution to the problem might include the use of a bead core capable of contracting increasingly in the presence of temperature increases caused by the deflation condition. The use of such a solution would make it possible to keep the bead core in the bead seat, even with no air pressure present in the tire. The solution, however, also require that the tire bead core has to be easily deformable for mounting onto the rim, and progressively contractible in the state of deflation. It was found that precisely, because of the conflicting demands of opposite deformability of the bead core at different temperature conditions, it was possible to solve the problem by forming a bead core comprising a material with characteristics of superelasticity and/or shape memory, preferably both. The entire bead core, or only a circular portion of it could be formed of the material.

As is known and as used herein, a material with characteristics of "superelasticity" is a material that can be progressively deformed to a high degree by applying a constant load and maintaining a constant temperature. The material then recovers from the deformation suffered when the load is removed and the temperature is left unchanged. Moreover, the material used also has properties of "shape memory" in the sense that when the material is subject to heating between two predetermined temperatures in conditions of mechanical constraint, it undergoes a transformation from a first structure to a second structure, producing a stress opposed by the constraints. The practical result is that a contraction force is exerted by the material on the constraints, when the temperature is raised beyond a preselected value.

The invention is thus a bead core for tires designed to allow easy assembly of the tire on a wheel rim by undergoing large elastic elongations to accommodate the dimensions of the rim, and at the same time capable of resisting the separation of the tire bead from the rim while driving after the tire has been punctured. This is achieved by providing at least one annular portion of the bead core which has both properties of superelasticity and of shape memory, so that it can react to changes in the tire operating conditions, and does not require specialized tools to mount the tire.

A first aspect of the invention is thus a metallic bead core for a tire bead designed to be applied to a wheel rim, the bead core being. formed from a material having characteristics of superelasticity and/or of shape memory.

The characteristics of superelasticity allow the bead core to deform at ambient temperature, producing increasing elongations for a constant load. This is due to a change in the structure of the superelastic material due to the loading. This load is defined as the critical load of transformation. The bead can thus slip over the balcony of the wheel rim without causing heavy load stresses on the material. Subsequent removal of the load at ambient temperature allows recovery from the deformation, while the gripping pressure exerted by the tire beads on the bead seats is maintained.

Furthermore, the characteristics of shape memory of the bead core are such as to generate, during operation of the tire, forces of contraction which maintain the beads in the bead seats. These forces of contraction increase as a function of the heating to which the bead core is subjected, because the structure of the shape memory material changes as a result of a change in temperature. The described forces of contraction are particularly useful in increasing the grip of the beads on the rim, keeping the tire from unseating when in a deflated condition.

Preferably, the bead core is formed by a material having characteristics which comprise:
a) a temperature $A_s < Ta$
b) a temperature $A_f < T_{max}$ where:
$A_s$ is the temperature of transformation of the material corresponding to the passage from a martensitic structure to the start of the formation of an austenitic structure;
$A_f$ is the temperature corresponding to the complete transformation of the material structure into austenite;
Ta is the ambient temperature;
$T_{max}$ is the predetermined temperature corresponding to the maximum temperature reached by the tire using the present bead core, while operating in a deflated condition.

A second aspect of the invention consists of a tire having at least one toroidal carcass and one tread, the carcass presenting a central crown and two sidewalls terminating in a pair of annular beads, each incorporating a metallic bead core for anchoring the bead to a corresponding mounting rim. The tire is characterized by having at least one bead comprising a bead core made of a superelastic and shape memory material, which allows increasing deformations of the bead core when subject to a mounting load of constant magnitude at ambient temperature, and which recovers the original circular dimension of the bead core once the load ceases.

Preferably, the tire includes at least one portion of the bead core material having superelasticity and shape memory characteristics, which increase the force of inward contraction of the bead core when a predetermined temperature is reached. The contraction force develops as the tire operates while deflated, and increases the gripping force of the bead on the rim.

Another aspect of the invention is a method for mounting a tire to a rim having a balcony portion, having the steps of forming a tire with bead cores comprising at least one portion made of superelastic and shape memory alloy, and successively stretching each bead core by applying a constant load so they will slide over the balcony portion of the rim. The constant load is then released to allow the bead wire to return to a length corresponding to the rim diameter, and the tire is inflated.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention and are incorporated in and constitute a part of the specification, illustrate several embodiments of the invention, and together with the description serve to explain the principles of the invention. In the drawings.

DETAILED DESCRIPTION OF THE EXEMPLARY EMBODIMENTS

Reference will now be made in detail to the present preferred embodiments of the invention, examples of which are described in the accompanying specification and illustrated in the accompanying drawings.

While the present invention can be broadly applied in the field of tires, it is especially well suited for use in radial-type tires. A radial-type tire 1 is described with reference to FIG. 1, but without thereby excluding from the scope of the invention other types of tires, such as those commonly known as bias-belted carcass ply tires.

Figure 1:
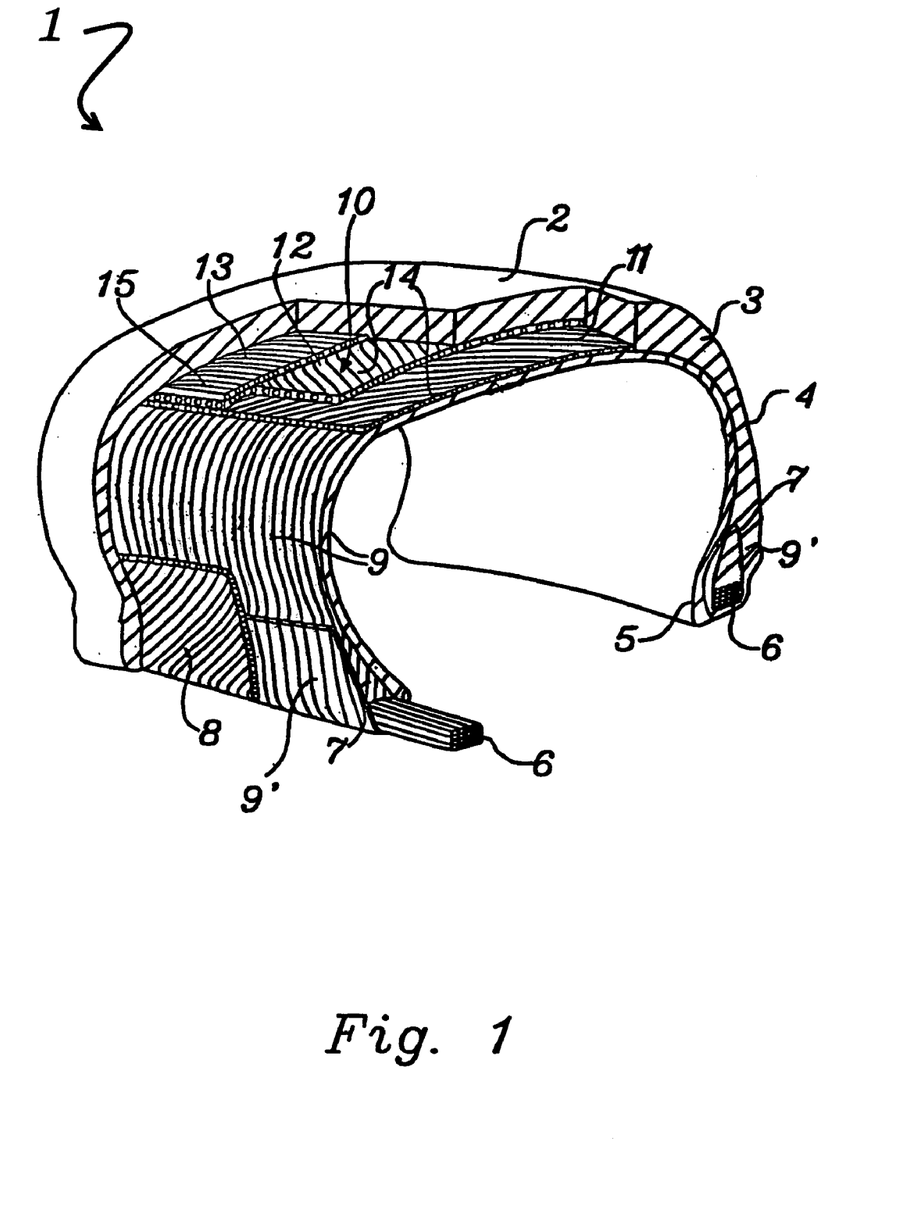
FIG. 1 is a partial perspective view, with some removed parts, showing a tire with a bead core according to the invention.

Tire 1 includes tread band 2, shoulders 3, and sidewalls 4. The ends of tire 1 include a pair of beads 5, bead cores 6, bead filler 7, and optionally a reinforcement borders 8. Tire 1 further comprises radial carcass 9 with reinforcing elements arranged in a meridian plane. Tire 1 also includes a belt structure 10 arranged between the carcass 9 and the tread band 2.

Carcass 9 is formed of one or more carcass plies with edges 9' folded outward around bead cores 6. The structure of belt 10 comprises a group of belts formed of three rubberized fabrics 11, 12, 13 incorporating reinforcing elements. The first two radially innermost fabrics 11, 12, comprise preferably steel reinforcement cords 14 inclined at an angle to the equatorial plane of tire 1, so that the respective cords 14 crisscross each other. The radially outermost rubberized fabric 13 comprises preferably nylon cords 15. Nylon cords 15 are oriented at an angle of 0° with respect to the equatorial plane of tire 1. Tire beads 5 are designed to be mounted onto a wheel rim (not shown).

Figure 2:
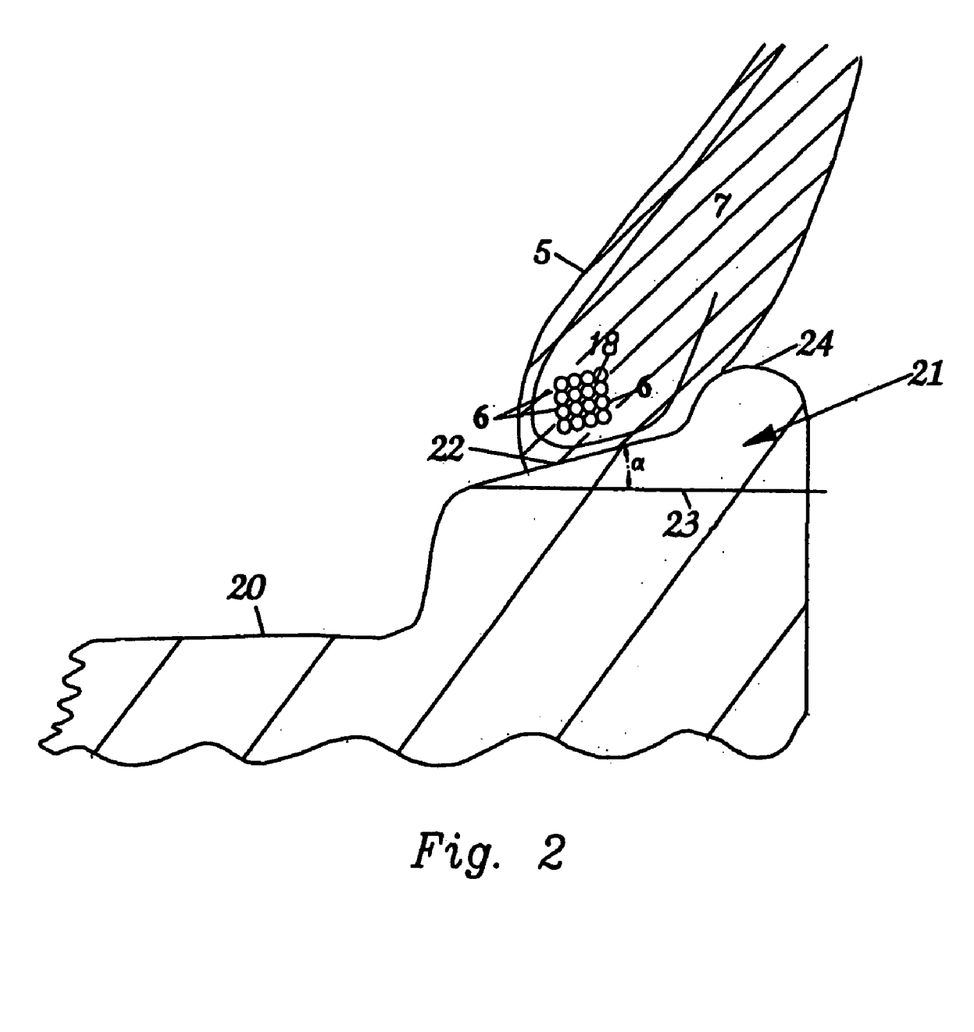
FIG. 2 is a cross section showing a detail of a tire bead connected to the relative bead seat of the wheel rim on which the tire is mounted.

FIG. 2 illustrates an example of an embodiment of the invention. Tire bead 5 is applied to a wheel rim of which only the upper edge is shown. The rim has a cylindrical central channel 20 and two outwardly diverging, lateral bead seats of which only one is shown in the figure as numeral 21. The other seat and tire bead combination is symmetrical to the shown combination about a vertical axis of the figure.

Lateral bead seat 21 is formed by surface 22 inclined at an angle α with respect to a line 23 parallel to the axis of the rim. Angle α may vary according to the type of tire, for example, from 5 degrees in tires for automobiles to 15 degrees in tires for trucks. Lateral bead seat 21 comprises flange 24, whose surface supports the lower part of the external lateral surface of the bead 5, as shown in FIG. 2. Flange 24 is also known as the rim balcony.

In one preferential example, the bead core is made entirely of a metal alloy of a superelastic shape memory material, having characteristics useful for obtaining high deformability of the bead core while mounting the bead onto the wheel rim of the tire at ambient temperature.

Materials with characteristics of superelasticity are described in general terms in the publication *Engineering Aspects of Shape Memory Alloys* (Butterworth-Heinemann ed., London, 1990). The material forming the bead core may consist of numerous metals, in particular alloys of Ni—Ti, NiTiX (X=Fe, Cu, Nb), CuZnAl, CuAlNi, CuAlBe, FeMnSi-based alloys, and FeNiCo-based alloys.

Bead core 6 is formed of a single rubberized wire 18 wound in a spiral to form a first layer of a plurality of coils placed side by side on a single horizontal plane. The wire is then wound as explained above to form additional coils on successive layers to the first. The bead core suitable for use in car tires of FIG. 2 is formed by four layers, each with four coils. The wire preferentially has a diameter of between 0.8 to 2.0 mm. More preferably, the wire has a diameter of 0.96 mm.

Figure 3:
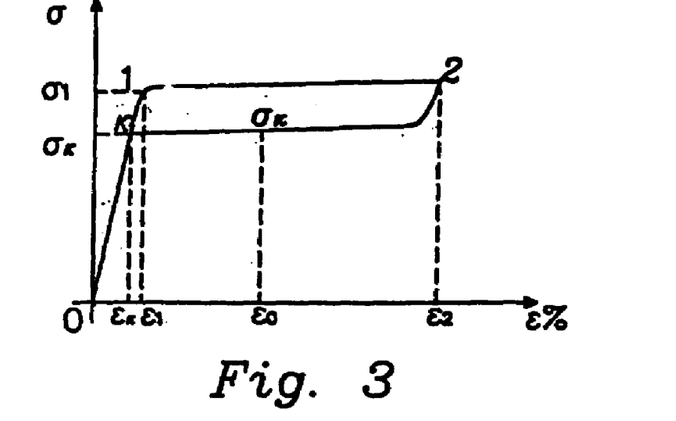
FIG. 3 is a qualitative stress-strain graph of the behavior of the bead core while the bead is mounted onto the seat of FIG. 2.

To provide a better understanding of the invention, FIG. 3 illustrates a qualitative example of the behavior of the bead core while it is stretched to pass over the rim balcony, or flange, and while it is gripping onto the seat of the rim. FIG. 3 is a Cartesian diagram showing a stress-strain curve. On the ordinate is shown the stress applied to the bead core to deform it, and on the abscissa the elongation deformations of the bead core, expressed as a percentage of its original dimensions.

At the diagram's point of origin, the bead core is in the state of a superelastic shape memory material with an austenitic structure. The segment of curve between point 0 and point 1 represents the stress of deformation applied to the bead core. Starting at point 1 the material passes from an austenitic structure to a martensitic structure, which is fully reached at point 2, which corresponds to a percent elongation deformation $\epsilon 2$. The value $\sigma 1$ corresponding to $\epsilon 1$ represents the critical load of transformation causing the bead core to start changing structure from austenitic to martensitic. As shown in FIG. 3, the transformation of the bead core structure from austenitic to martensitic allows the bead core to be deformed by a large percentage elongation, while the load applied to the bead core remains constant.

The segment parallel to the axis of the abscissa between point 1 and point 2 corresponds to a state where the martensite structure is induced by stress in the bead core. The transformation is purely mechanical and takes place at constant temperature.

The percentage value of elongation $\epsilon 2$ corresponding to point 2 represents the desired percentage deformation which allows the bead incorporating the bead core to surpass the balcony of the rim. After mounting, the load applied to the bead core is removed. If the bead core were free to contract, it would go from point 2 to point K on the initial segment of the curve of FIG. 3. In practice, the now unloaded bead core recovers from the previous sudden deformation due to its superelastic properties, and reaches an elongated condition $\epsilon o$ corresponding to the dimension of the bead seat, where the bead of the tire is seated.

At the elongation value $\epsilon o$, the material has a structure consisting partly of martensite and partly of austenite, with the martensite component being reduced as $\epsilon o$ approaches line 0–1 in the diagram of FIG. 3. The value of the stress exerted by the bead core on the bead seat is reduced relative to the value of the critical load, and assumes a value of $\sigma k$. The reduction in stress of contraction $\sigma k$ with respect to stress $\sigma 1$ depends on the heat treatment that the material underwent before forming the bead core, and in particular depends on the temperatures at which the material transforms from an austenitic structure to a martensitic structure, and vice versa.

In a bead core made with superelastic shape memory material, the difference in value between $\sigma 1$ and $\sigma k$ may preferentially range between 50 MPa and 300 MPa.

The same procedure and considerations apply when the second tire bead is mounted onto the rim. Once both beads are mounted on the wheel rim, pressurized air is admitted into the tire to press the two tire beads axially outward against the surfaces of flange 24 provided on the rim, as shown in FIG. 2.

Figure 4:
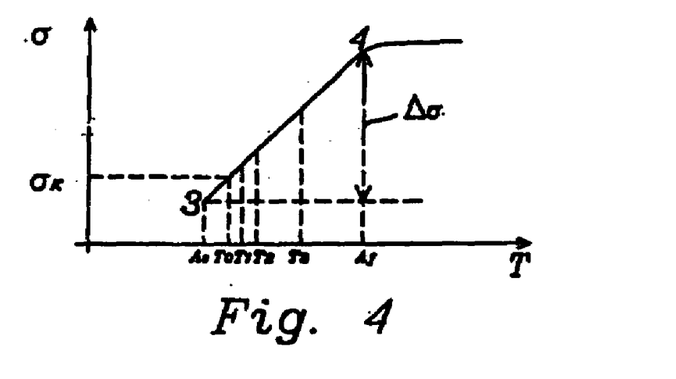
FIG. 4 is a qualitative graph showing the increment of the bead core's stresses of contraction as temperature varies up to the maximum value required to resist unseating while deflated.

In addition, the bead core made of superelastic shape memory material possesses characteristics useful in maintaining the beads within the bead seats when the tire is deflated. For a better understanding of these characteristics, FIG. 4 is a Cartesian diagram where the abscissa shows the heating temperatures to which the tire bead, and with it the bead core, are subjected to while in normal operation and while in the deflated condition. The ordinate shows the stresses to which the bead core is subjected which transform its structure during heating.

Point 3 in FIG. 4 represents the stress originating in the bead core at temperature As, corresponding to the end of the martensitic. state and the start of the formation of the austenitic structure. Point 4 represents the stress originating in the bead core at the temperature of complete formation of the austenitic structure. The line segment between points 3 and 4 represents the gradual increment of stress originating in the bead core during the transformation.

The symbol $\Delta \sigma$ represents the stress of reconversion from the martensitic to the austenitic structure, corresponding to an increased contraction of the bead core, and with it of the bead, against the support seat of the rim. The value $\Delta \sigma$ is chosen to produce a strong locking force of the beads into the respective bead seats, and to resist any unseating while the wheel travels with a flat tire.

The present bead core made of superelastic shape memory material possesses characteristics that are useful both to facilitate mounting the tire to the rim at ambient temperature, and to resist unseating when puncturing of the tire occurs. The present description of characteristics at ambient temperature is intended to cover the wide range of ambient temperatures that can exist when the tire is mounted onto the rim in any season of the year, and in different locations. The ambient temperatures referred to may range, for example, between −20 and +35 Deg. C.

Figure 5:
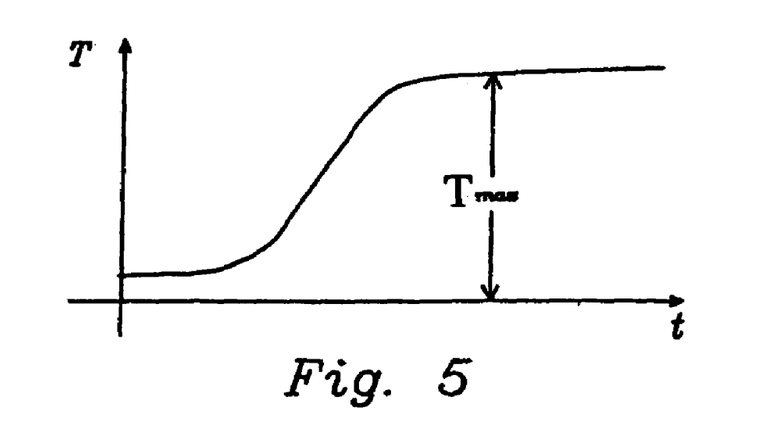
FIG. 5 is a qualitative graph of the temperature variations over time in a tire that heats up while deflated.

To make the invention more easily understandable, FIG. 5 shows a Cartesian diagram depicting the progression of the heating curve for the area surrounding the beads of a deflated tire. Time is shown on the abscissa and temperatures on the ordinate. As can be seen in the diagram, after a constant segment representing normal running conditions, a deflation occurs, followed by an initially linear increase of temperature. This is still followed by another constant temperature segment corresponding to a temperature $T_{max}$. Beyond this point the temperature substantially stabilizes and no longer increases with time.

Temperature $T_{max}$ is reached in the case of deflation after a time between 20 seconds and 2 minutes, and as a guideline can range between 60 Deg. C. and 120 Deg. C.

In one example of an embodiment applicable to an automobile tire, the bead core made of superelastic shape memory material can have the following preferred characteristics to obtain good properties both for mounting at ambient temperature, and for resisting unseating following a flat:

- alloy NiTi with a percentage of Ni of 50.6 at % and percentage of Ti of 49.4 at %, measured as atomic percentages.
- temperature As of start of austenite formation phase between 15 Deg. C. and 60 Deg. C.
- temperature Af of finishing of austenite formation between 60 Deg. C. and 80 Deg. C.

critical stress of transformation $\sigma 1$ from austenite to start of stress-induced martensite formation between 0.2 and 0.7 GPa elongation value $\epsilon 1$ in correspondence with $\sigma 1$ equal to 0.2% elongation value $\epsilon 2$ in correspondence with $\sigma 1$ equal to 6% stress $\sigma k$ in correspondence with recovery of deformation when the load is released equal to 0.2 GPa elongation value $\epsilon o$ in correspondence with $\sigma k$ equal to 4% value $\Delta \sigma$ of the stress of reconversion from martensite to austenite between 0.21 and 0.6 GPa.

Furthermore, the characteristics of the bead core material must comply with the following expressions:

temperature As<Ta
temperature Af<$T_{max}$ where Ta indicates ambient temperature and $T_{max}$ the maximum temperature reached in conditions of deflation.

Regarding the first critical condition, in the case of a material with temperature As of the start of phase change greater than ambient temperature, the transformations indicated in the graph of FIG. 3 would not be applicable. In fact, a material forming a bead core having a martensitic structure and a temperature Ta<As would be in a condition, at point 2, where removing the load would still leave the material in the martensitic state. In that situation, removing the load would be described by passage from point 2 to a point on the abscissa, or X-axis of the graph of FIG. 3, without the material recovering from the previous deformation.

Regarding the second critical relationship, it was found worthwhile to have the maximum contraction of the bead core take place at a temperature below the maximum temperature value $T_{max}$ reached in deflation, since a maximum contraction at a higher temperature would not have had any positive effect, and might possibly cause problems, given the constancy over time of the maximum temperature reached.

In one particular preferred example of an embodiment, the characteristics of the superelastic shape memory material of the bead core are indicated below, in the case in which the ambient temperature for mounting the tire is 25 Deg. C. and the maximum temperature reached after deflation $T_{max}$ is equal to 100 Deg. C.

temperature As, at start of austenite formation 20 Deg. C.
temperature Af, at end of austenite formation 80 Deg. C.
critical stress of transformation $\sigma 1$ from austenite to induced martensite equal to 0.25 GPa
value of elongation $\epsilon 1$ corresponding to $\sigma 1$ equal to 0.2%
value of elongation $\epsilon 2$ corresponding to $\sigma 1$ equal to 6%
stress $\epsilon k$ corresponding to deformation recovery equal to 0.2 GPa
value of elongation $\epsilon o$ in correspondence with $\sigma k$ equal to 4%
value $\Delta \sigma$ of the stress of reconversion from martensite to austenite between 0.2 and 0.6 GPa.

In one further embodiment, the bead core could be formed not of wires, but of metal strips of alloy NiTi successively wrapped over themselves. In this embodiment the thickness of the metal strips could be comprised between 0.3 and 0.9 mm and their width between 4 and 8 mm.

As has been seen, the tire described above may make use of a bead core made of a material having superelastic shape memory characteristics throughout its entire cross section and its entire annular extent. In some other embodiments according to the invention, the tire may comprise bead cores with at least one portion of the entire annular extent made of superelastic shape memory material, while the remaining portion is made of conventional steel wires.

The tire could, for example, comprise a bead core formed of several different wires, each wire forming a series of coils radially superimposed along a vertical plane, with vertical planes separating them. A construction of the bead core with several different wires formed, for example, by four wires and four layers, is identified by the abbreviation 4×4. The bead core could be formed by making the coils along some vertical planes with a material having the characteristics of the invention, and those of the remaining planes with conventional steel wires, or by alternating the wires with characteristics of superelasticity with conventional steel wires.

Instead of individual wires, the bead core may comprise other elements of reinforcement, such as metal strips, cords, and the like, whose configuration is determined by the radial superposition of the coils of an element, placed next to the radial coils of another element.

In yet another embodiment, the tire could have spiral-type bead cores formed of a central cable surrounded by several steel wires wrapped in a spiral. The spiral bead core could comprise a section made entirely of material with characteristics according to the invention, or in other embodiments the cable could be of superelastic shape memory material and the wires could be steel. Alternatively, the cable and some of the wires could be of superelastic shape memory material and the remaining wires steel.

In all cases, the various embodiments of bead cores having several wires or several reinforcement elements other than wires, including those described above, are constructed so that no matter how many wires or reinforcement elements are present, they still possess the desired mounting characteristics at ambient temperature, and the ability of increasing contraction loads against the bead seats in response to temperature increases in operation, in particular in deflation conditions. The bead core is thus constructed with dimensions, quantities, and physical properties of wires or reinforcing elements appropriately selected to facilitate mounting at ambient temperature, and to obtain better grip against the bead seats in case of deflation.

In another preferential embodiment, the bead core is made of several different wires, and comprises a portion made of superelastic shape memory material having the following construction:

number of wires made of superelastic shape memory material 3
number of conventional steel wires 2
number of radial coils 5
diameter of wire of superelastic shape memory material 0.96 mm
diameter of steel wire 0.96 mm
rubber coating of 0.12 mm thickness, and hardness of 80 IRDH
breaking load with tension of the wire of superelastic shape memory material 1 GPa
percentage elongation at breaking load of the wire of superelastic shape memory material 16%
breaking load with tension of the steel wire 2–3 GPa
percentage elongation of the steel wire at breaking load 6%

The physical properties of the wire having characteristics of superelasticity and shape memory that is constrained at the ends are:

temperature As of start of austenite formation 20 Deg. C.
temperature Af of finishing of austenite formation 70 Deg. C.

critical stress of transformation σ1 from austenite to start of induced martensite equal to 0.3 GPa elongation value ε1 corresponding to σ1 equal to 0.2% elongation value ε2 corresponding to σ1 equal to 6% stress σk corresponding to recovery of deformation, equal to 0.15 GPa value of elongation ε0 corresponding to σk equal to 4% value Δσ of stress of reconversion from martensite to austenite between 0.2 and 0.8 GPa.

Using these preferred parameters the invention meets all the expected goals. The tire is assembled on the wheel rim at ambient temperature by applying a constant force to the bead core, so it will elongate to a dimension suitable to allow the bead of the tire to slip easily over the balcony of the rim, without inducing heavy stresses on the material.

As already described with reference to FIG. 3, once the stress value corresponding to the critical load of transformation σ1 is reached, the percentage deformation under a constant load increases considerably.

Figure 6:
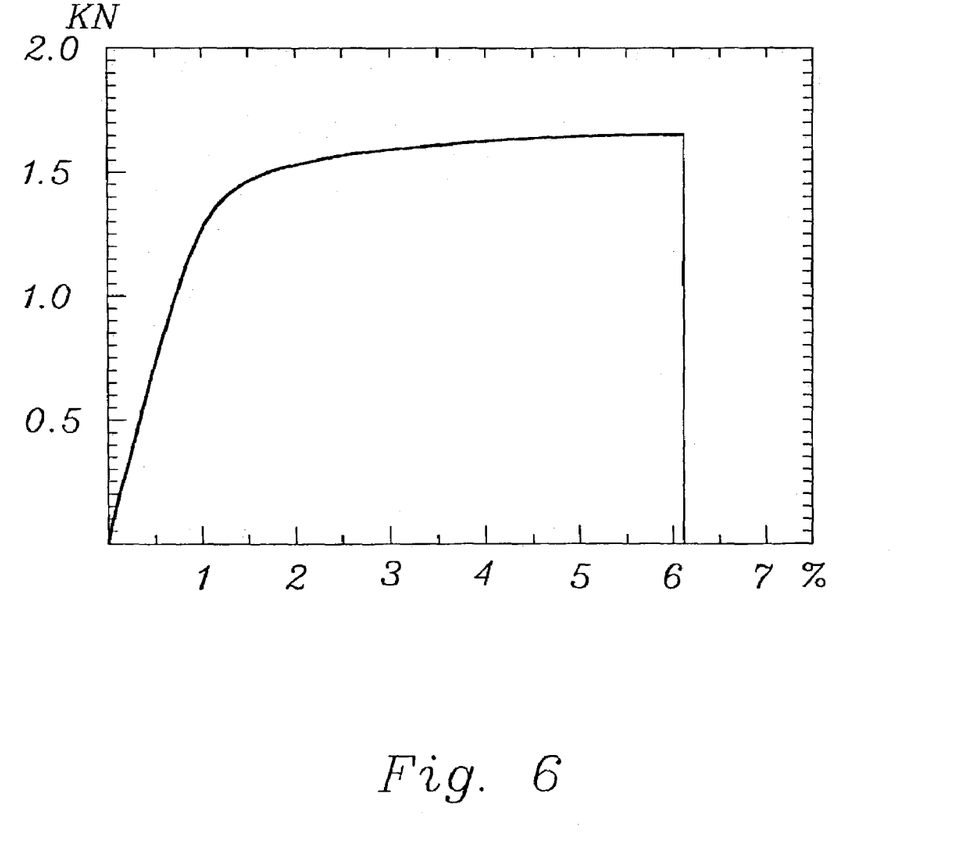
FIG. 6 is stress/strain graph showing the behavior of a wire of a bead core made according to the state of the art.

To provide a better understanding of the advantages gained from the invention, FIG. 6 shows the loads-deformations curve for a 0.96 mm diameter steel wire used in a conventional metallic bead core. Load values, expressed in kN, are reported on the ordinate, and the values of percentage elongation from the rest condition are reported on the abscissa. FIG. 6 shows a first linear graph segment, followed by a curved segment beyond which the yielding conditions of the material are approached. At the end of the straight-line segment of the graph, the wire used in a conventional bead core represented in FIG. 6 shows a deformation below 1.0% at a load of 1.3 kN.

A wire according to the present invention, made for example entirely of a superelastic NiTi alloy material of diameter 0.96 mm and used to make a wire bead analogous to the conventional bead core described above, would have a maximum elongation percentage ε2 of 6%, at an ambient temperature of 25 Deg. C. and under a critical stress of transformation σ1 of 400 MPa corresponding to 0.3 KN. The deformations can be recovered at ambient temperature by removing the load causing the deformation.

A comparison between a conventional bead core and one according to the invention demonstrates that the former cannot reach the percentage elongation values of the latter. A bead core according to the invention can be deformed to elongation values between 1 and 6%, while a conventional bead core can have elastic percentage elongation values of approximately 1% to 1.5%, beyond which its structure is compromised and is of limited use.

Furthermore, the bead core according to the invention allows a tire to be mounted on the rim at ambient temperature with the equipment found in any ordinary tire maintenance and mounting shop. Therefore the present solution has an advantage over other proposed solutions, because assembly of the tire on the rim requires carrying out the operation at ambient temperatures, and does not require specialized heating equipment to achieve the mounting temperatures called for by other methods.

The invention further allows the bead core to be mounted even when the bead seat of a rim has dimensions outside the expected tolerances, and thus does not match the nominal dimensions of the bead core and relative bead. This is possible by forming a bead core with a superelastic shape memory material having a stress-induced martensitic structure, capable of giving the bead core a desired elongation deformation, at ambient temperature, under a constant load. This result can be understood from an examination of FIG. 3. When the bead seat and the height of the balcony are smaller than nominal, the elongation deformation of the bead core can be arrested before point 2 is reached. The release of the load will then allow recovery of the deformation up to the new value ε to the left of $ε_0$, which corresponds to the actual dimension of the bead seat.

When the dimensions of the bead seat and the height of the balcony are greater than the nominal dimensions, the value of elongation of the bead core can be further increased at ambient temperature and under a constant load. The load can subsequently be released to recover the deformation to the value imposed by the actual dimension of the bead seat.

In practice, the bead core offers improved performance during mounting by adjusting automatically to the dimensions of the object onto which it must be mounted. The characteristics of the invention also allow maintaining safely the correct gripping pressure of the tire beads on the bead seat over time.

In fact, during operation the gripping pressure of the tire beads tends to increase, as can be understood from an examination of FIG. 4. In FIG. 4, σk represents the value of the stress that the contracting bead core exerts on the rim at a mounting temperature Ta.

In operation, the tire is heated to a gradually increasing, though limited, temperature. As the tire heats up, heat is transmitted to the bead core resulting in a corresponding gradual increase of the stress F applied to the bead seat. The stresses during operation are qualitatively represented on the ordinate in FIG. 4 as a function of the temperatures Ta, T1, T2, and T3. Therefore, the bead core according to the invention not only determines the correct pressure that the tire beads should apply to the bead seat, but also tends to increase its value, with obvious advantages to the safe running of the tire.

The characteristics of the invention also permit automatic regulation of the gripping force exerted by the bead core on the bead seat, particularly in response to heavy conditions of use such as those encountered by a high-performance tire of the type inflated with air pressure of 3 bar. In fact, it is common for a high-performance tire to be subject to sudden braking, with the risk of slippage of the bead in its seat on the wheel rim causing a reduction in the braking effect. This risk is avoided thanks to the invention because during braking the metal rim is subject to intense heating which is transmitted immediately to the bead cores made of superelastic shape memory metal alloy. This causes an increase of the stress F applied on the wheel rim by contraction of the bead cores.

In FIG. 4 the greatest stress in the aforementioned conditions is represented, only by way of a qualitative example, at temperature T3. In practice, during the extreme conditions which may occur during braking, the bead core automatically increases the pressure on the bead seat, preventing any slippage of the tire bead over the rim.

The invention also eliminates any risk of the tire coming off, or unseating from the rim, even in case of puncturing and complete loss of air pressure from the tire. This result is obtained because the material of the bead cores is designed to have a temperature Af lower, but preferably quite close, to the maximum temperature $T_{max}$ occurring when running the tire while deflated.

The values of contraction stresses σ of the bead core begin to increase at a temperature As, lower than the ambient temperature Ta, and progress to a maximum value when reaching the temperature Af, which in many cases is close to 120 Deg. C. The values of contraction of the bead core corresponding to temperatures Af will be noticeably greater than those obtained at ambient temperature Ta, with a consequent increase of the stresses that lock the tire beads on the rim while running on a flat tire. It is thus possible for a vehicle using tires made according to the invention to travel safely several tens of kilometers on a flat tire, and reach a garage where the flat tire may be replaced.

In one preferred embodiment according to the invention, the bead core contraction stress F corresponds to a temperature Af between 95 Deg. C. and 120 Deg. C., equal to 0.8 GPa, and which can be computed as a function of bead core geometry and of bead wire stress.

It is thus clear that the invention is not limited strictly to what has been described above. It will be apparent to those skilled in the art that various modifications and variations can be made in the structure of the present invention without departing from the spirit or scope of the invention. Thus, it is intended that the present invention cover the modifications and variations of this invention provided they come within the scope of the appended claims and their equivalents.

The invention claimed is:

1. A method of mounting a tire on a rim, comprising:
selecting a tire comprising bead cores;
stretching the bead cores;
sliding the bead cores over a balcony portion of the rim;
allowing the bead cores to elastically return to lengths corresponding to diameters of respective seats of the rim; and
inflating the tire;
wherein the bead cores comprise one or more portions of material with characteristics of superelasticity and shape memory, and
wherein stretching the bead cores comprises applying constant load to the bead cores at ambient temperature.

2. The method of claim 1, wherein the one or more portions of material are metal.

3. The method of claim 1, wherein the one or more portions of material comprise nickel and titanium.

4. The method of claim 1, wherein the one or more portions of material are alloys of nickel and titanium.

5. A method of mounting a tire on a rim, comprising:
selecting a tire comprising first and second bead cores;
stretching the first bead core;
sliding the first bead core over a balcony portion of the rim;
allowing the first bead core to elastically return to a length corresponding to a diameter of a first seat of the rim;
stretching the second bead core;
sliding the second bead core over the balcony portion of the rim;
allowing the second bead core to elastically return to a length corresponding to a diameter of a second seat of the rim; and
inflating the tire;
wherein at least one bead core comprises one or more portions of material with characteristics of superelasticity and shape memory,
wherein stretching the first bead core comprises applying a constant first load to the first bead core at ambient temperature, and
wherein stretching the second bead core comprises applying a constant second load to the second bead core at ambient temperature.

6. The method of claim 5, wherein the one or more portions of material are metal.

7. The method of claim 5, wherein the one or more portions of material comprise nickel and titanium.

8. The method of claim 5, wherein the one or more portions of material are alloys of nickel and titanium.

9. The method of claim 5, wherein the first load is equal to the second load.

10. A method of mounting a tire on a rim, comprising:
selecting a tire comprising bead cores;
stretching the bead cores;
sliding the bead cores over a balcony portion of the rim;
allowing the bead cores to elastically return to lengths corresponding to diameters of respective seats of the rim; and
inflating the tire;
wherein the bead cores comprise one or more portions of material with characteristics of superelasticity and shape memory, and
wherein stretching the bead cores comprises causing the bead cores to undergo structural change at ambient temperature.

11. The method of claim 10, wherein the one or more portions of material are metal.

12. The method of claim 10, wherein the one or more portions of material comprise nickel and titanium.

13. The method of claim 10, wherein the one or more portions of material are alloys of nickel and titanium.

14. The method of claim 10, wherein the structural change comprises complete change from austenitic structure to martensitic structure.

15. The method of claim 10, wherein the structural change comprises partial change from austenitic structure to martensitic structure.

16. A method of mounting a tire on a rim, comprising:
selecting a tire comprising first and second bead cores;
stretching the first bead core;
sliding the first bead core over a balcony portion of the rim;
allowing the first bead core to elastically return to a length corresponding to a diameter of a first seat of the rim;
stretching the second bead core;
sliding the second bead core over the balcony portion of the rim;
allowing the second bead core to elastically return to a length corresponding to a diameter of a second seat of the rim; and
inflating the tire;
wherein at least one bead core comprises one or more portions of material with characteristics of superelasticity and shape memory,
wherein stretching the first bead core comprises causing the first bead core to undergo structural change at ambient temperature, and
wherein stretching the second bead core comprises causing the second bead core to undergo structural change at ambient temperature.

17. The method of claim 16, wherein the one or more portions of material are metal.

18. The method of claim 16, wherein the one or more portions of material comprise nickel and titanium.

19. The method of claim 16, wherein the one or more portions of material are alloys of nickel and titanium.

20. The method of claim 16, wherein the structural change of the first bead core comprises complete change from austenitic structure to martensitic structure.

21. The method of claim 16, wherein the structural change of the first bead core comprises partial change from austenitic structure to martensitic structure.

22. The method of claim 16, wherein the structural change of the second bead core comprises complete change from austenitic structure to martensitic structure.

23. The method of claim 16, wherein the structural change of the second bead core comprises partial change from an austenitic structure to a martensitic structure.

24. The method of claim 16, wherein the structural change of the first bead core comprises complete change from austenitic structure to martensitic structure, and
wherein the structural change of the second bead core comprises complete change from austenitic structure to martensitic structure.

25. The method of claim 16, wherein the structural change of the first bead core comprises partial change from austenitic structure to martensitic structure, and
wherein the structural change of the second bead core comprises partial change from austenitic structure to martensitic structure.

26. A method of mounting a tire on a rim, comprising:
selecting a tire comprising bead cores;
stretching the bead cores;
sliding the bead cores over a balcony portion of the rim;
allowing the bead cores to elastically return to lengths corresponding to diameters of respective seats of the rim; and
inflating the tire;
wherein the bead cores comprise one or more portions of material with characteristics of superelasticity and shape memory,
wherein the one or more portions of material are deformable at ambient temperature in response to constant force, and
wherein the one or more portions of material recover to original shape upon removal of the constant force.

27. The method of claim 26, wherein the one or more portions of material are metal.

28. The method of claim 26, wherein the one or more portions of material comprise nickel and titanium.

29. The method of claim 26, wherein the one or more portions of material are alloys of nickel and titanium.

30. The method of claim 26, wherein the one or more portions of material are alloys of nickel, titanium, and one of copper, iron, or niobium.

31. The method of claim 26, wherein the one or more portions of material are alloys of aluminum, copper, and one of beryllium, nickel, or zinc.

32. The method of claim 26, wherein the one or more portions of material are iron-manganese-silicon-based alloys.

33. The method of claim 26, wherein the one or more portions of material are cobalt-iron-nickel-based alloys.

34. A method of mounting a tire on a rim, comprising:
selecting a tire comprising first and second bead cores;
stretching the first bead core;
sliding the first bead core over a balcony portion of the rim;
allowing the first bead core to elastically return to a length corresponding to a diameter of a first seat of the rim;
stretching the second bead core;
sliding the second bead core over the balcony portion of the rim;
allowing the second bead core to elastically return to a length corresponding to a diameter of a second seat of the rim; and
inflating the tire;
wherein at least one bead core comprises one or more portions of material with characteristics of superelasticity and shape memory,
wherein the one or more portions of material are deformable at ambient temperature in response to constant force, and
wherein the one or more portions of material recover to original shape upon removal of the constant force.

35. The method of claim 34, wherein the one or more portions of material are metal.

36. The method of claim 34, wherein the one or more portions of material comprise nickel and titanium.

37. The method of claim 34, wherein the one or more portions of material are alloys of nickel and titanium.

38. The method of claim 34, wherein the one or more portions of material are alloys of nickel, titanium, and one of copper, iron, or niobium.

39. The method of claim 34, wherein the one or more portions of material are alloys of aluminum, copper, and one of beryllium, nickel, or zinc.

40. The method of claim 34, wherein the one or more portions of material are iron-manganese-silicon-based alloys.

41. The method of claim 34, wherein the one or more portions of material are cobalt-iron-nickel-based alloys.

* * * * *